(12) United States Patent
Chang et al.

(10) Patent No.: US 11,761,819 B2
(45) Date of Patent: Sep. 19, 2023

(54) TEMPERATURE CALIBRATION METHOD FOR EAR THERMOMETER WITH PROBE COVER

(71) Applicant: RADIANT INNOVATION INC., Hsinchu County (TW)

(72) Inventors: Yung-Chang Chang, Hsinchu County (TW); Tseng-Lung Lin, Hsinchu County (TW); I-Ling Chen, Hsinchu County (TW)

(73) Assignee: RADIANT INNOVATION INC., Hsinchu County (TW)

( * ) Notice: Subject to any disclaimer, the term of this patent is extended or adjusted under 35 U.S.C. 154(b) by 294 days.

(21) Appl. No.: 17/225,079

(22) Filed: Apr. 7, 2021

(65) Prior Publication Data

US 2022/0326083 A1 Oct. 13, 2022

(51) Int. Cl.
*G01J 5/00* (2022.01)
*G01J 5/02* (2022.01)
*G01J 5/80* (2022.01)

(52) U.S. Cl.
CPC ............. *G01J 5/0011* (2013.01); *G01J 5/021* (2013.01); *G01J 5/0265* (2013.01); *G01J 5/80* (2022.01)

(58) Field of Classification Search
CPC ........ G01J 5/0011; G01J 5/021; G01J 5/0265; G01J 5/80
USPC ........................................................ 374/1, 2
See application file for complete search history.

(56) References Cited

U.S. PATENT DOCUMENTS

2011/0160595 A1* 6/2011 Stone ................... A61B 5/0075
600/475
2022/0146319 A1* 5/2022 Chang ....................... G01J 5/00

FOREIGN PATENT DOCUMENTS

| CN | 102770175 | A | * | 11/2012 | ......... A61B 1/00142 |
|---|---|---|---|---|---|
| CN | 103196837 | B | * | 4/2015 | |
| CN | 207585777 | A1 | * | 7/2018 | |
| CN | 112414556 | A | * | 2/2021 | |
| CN | 112504478 | A | * | 3/2021 | |
| CN | 112857572 | A | * | 5/2021 | |
| JP | 4378003 | B2 | * | 12/2009 | |
| JP | 2015151308 | A | * | 8/2015 | |
| KR | 101545282 | B1 | * | 8/2015 | |
| TW | 202227021 | A | * | 7/2022 | |
| WO | WO-2005036115 | A1 | * | 4/2005 | |

* cited by examiner

*Primary Examiner* — Gail Kaplan Verbitsky
(74) *Attorney, Agent, or Firm* — Li & Cai Intellectual Property Office

(57) ABSTRACT

A temperature calibration method for an ear thermometer with a probe cover is provided. The temperature calibration method includes: providing the ear thermometer with the probe cover, the ear thermometer including a plurality of activation elements which are configured to sense an infrared transmittance of the probe cover to obtain a measured transmittance value; using the ear thermometer to measure an object to be tested to obtain an uncalibrated temperature; obtaining an infrared radiation energy emitted by the object to be tested, according to the uncalibrated temperature, the measured transmittance value, a preset transmittance value, and a radiation energy measurement formula; and calibrating the uncalibrated temperature to a calibrated temperature, according to a temperature calibration function.

6 Claims, 11 Drawing Sheets

```
┌─────────────────────────────────────────────────────────┐
│   providing the ear thermometer with the probe cover, the ear │
│ thermometer including the plurality of activation elements and│
│   the control element with the memory, the activation elements│
│ are configured to sense the infrared transmittance of the probe│─ S101
│       cover to obtain a measured transmittance value, and the │
│     memory stores a preset transmittance value corresponding  │
│          to the infrared transmittance of the probe cover     │
└─────────────────────────────────────────────────────────┘
                              │
                              ▼
        ┌──────────────────────────────────────────┐
        │ using the ear thermometer to measure an object │─ S102
        │ to be tested to obtain an uncalibrated temperature│
        └──────────────────────────────────────────┘
                              │
                              ▼
┌─────────────────────────────────────────────────────────┐
│ obtaining an infrared radiation energy emitted by the object │
│  to be tested, according to the uncalibrated temperature, the │─ S103
│  measured transmittance value, a preset transmittance value,  │
│         and a radiation energy measurement formula            │
└─────────────────────────────────────────────────────────┘
                              │
                              ▼
    ┌──────────────────────────────────────────────────┐
    │   calibrating the uncalibrated temperature to a calibrated │─ S104
    │ temperature, according to a temperature calibration function│
    └──────────────────────────────────────────────────┘
```

FIG. 1

TEMPERATURE CALIBRATION METHOD FOR EAR THERMOMETER WITH PROBE COVER

FIELD OF THE DISCLOSURE

The present disclosure relates to a temperature calibration method, and more particularly to a temperature calibration method for an ear thermometer with a probe cover.

BACKGROUND OF THE DISCLOSURE

Conventionally, ear or forehead thermometers are used as body temperature measuring devices to sense a temperature of a human body. However, due to an increased awareness of health and safety, a disposable ear cap is usually placed onto a probe of the ear thermometer before measuring an ear temperature. Generally speaking, a thickness of a top portion of the ear cap is relevant to an infrared transmittance of the ear cap. Therefore, when a user places ear caps of different thicknesses on the ear thermometer, an accuracy of the ear temperature that is measured by the ear thermometer is affected.

Therefore, by applying a suitable temperature calibration method, how the ear thermometer can appropriately calibrate different infrared transmittances to obtain a calibrated ear temperature that is accurate has become one of the important issues to be solved in this field.

SUMMARY OF THE DISCLOSURE

In response to the above-referenced technical inadequacies, the present disclosure provides a temperature calibration method for an ear thermometer with a probe cover.

In one aspect, the present disclosure provides a temperature calibration method for an ear thermometer with a probe cover. The temperature calibration method includes: providing the ear thermometer with the probe cover, the ear thermometer including a plurality of activation elements and a control element with a memory, the activation elements being configured to sense an infrared transmittance of the probe cover to obtain a measured transmittance value, and the memory storing a preset transmittance value corresponding to the infrared transmittance of the probe cover; using the ear thermometer to measure an object to be tested to obtain an uncalibrated temperature; obtaining an infrared radiation energy emitted by the object to be tested, according to the uncalibrated temperature, the measured transmittance value, a preset transmittance value, and a radiation energy measurement formula; and calibrating the uncalibrated temperature to a calibrated temperature, according to a temperature calibration function.

One of the beneficial effects of the present disclosure is that, in the temperature calibration method for the ear thermometer with the probe cover provided herein, through the technical solutions of "obtaining the infrared radiation energy emitted by the object to be tested, according to the uncalibrated temperature, the measured transmittance value, the preset transmittance value, and the radiation energy measurement formula" and "calibrating the uncalibrated temperature to the calibrated temperature, according to a temperature calibration function", the ear thermometer can perform calibration according to the probe covers with different infrared transmittances to obtain an accurate ear temperature value after the calibration is performed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a schematic flowchart of a temperature calibration method for an ear thermometer with a probe cover of the present disclosure;

DETAILED DESCRIPTION OF THE EXEMPLARY EMBODIMENTS

Figure 2:
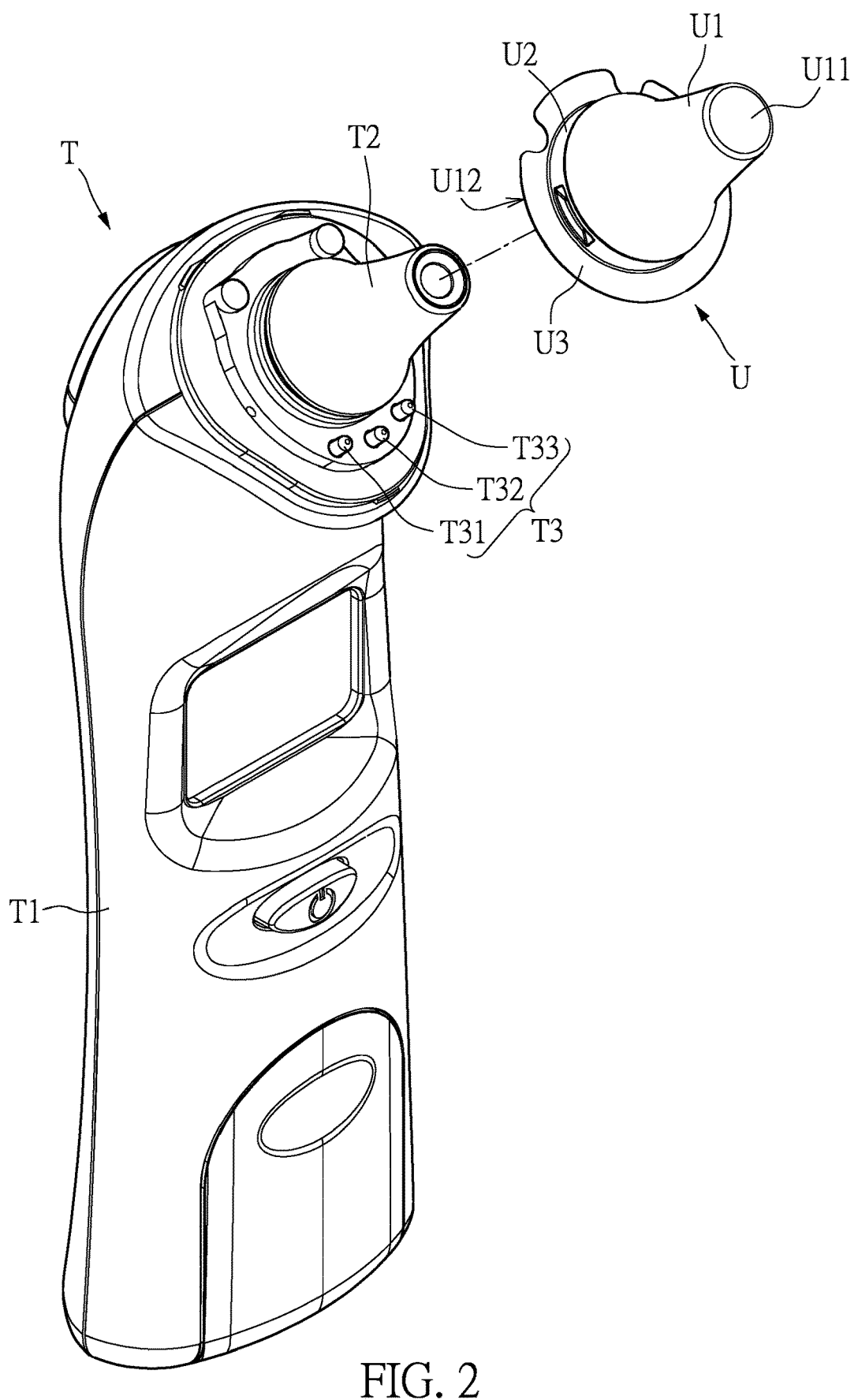
FIG. 2 is a schematic perspective view of the ear thermometer and the probe cover of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
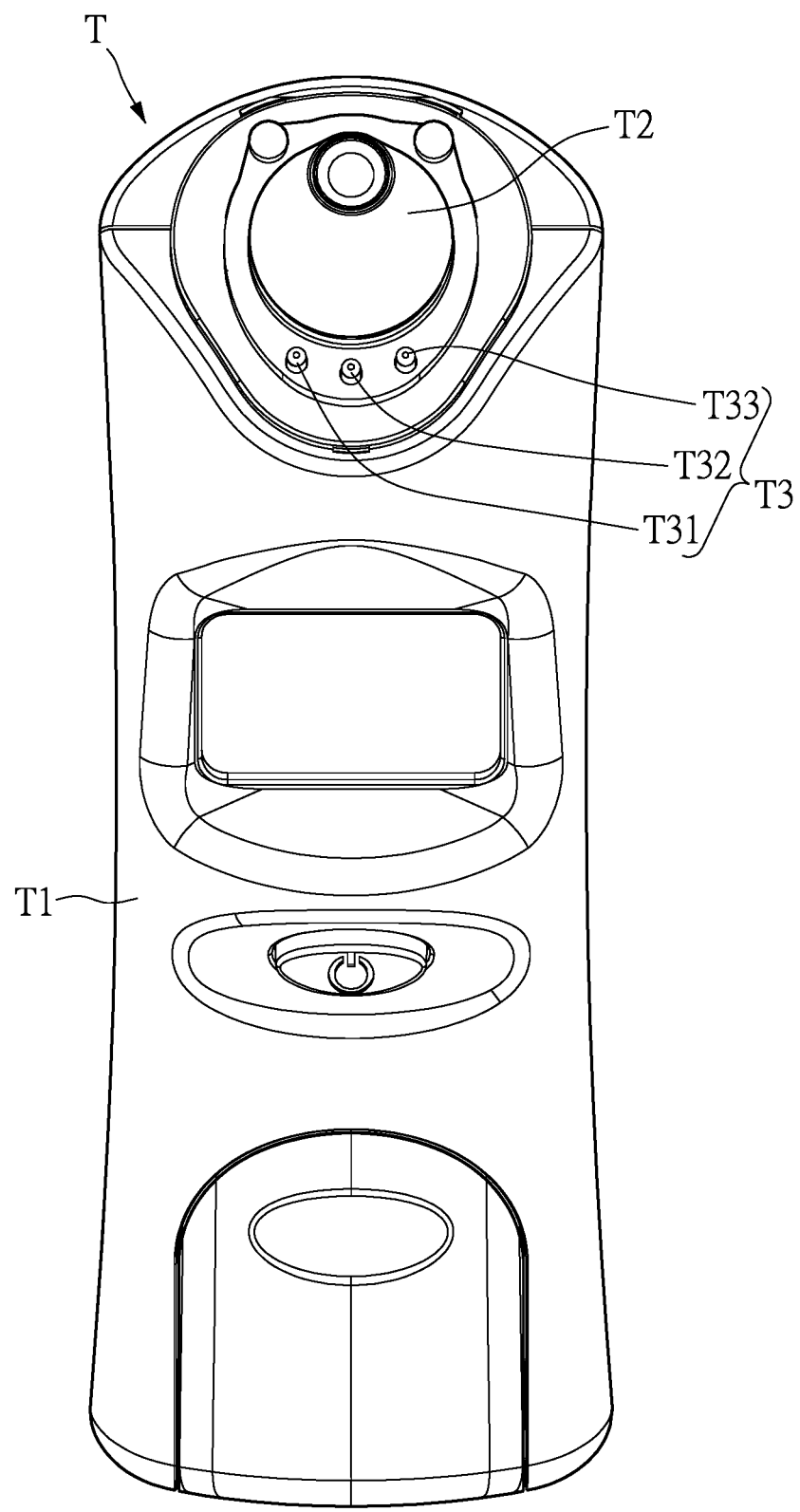
FIG. 3 is a schematic front view of the ear thermometer of the present disclosure.

References are made to FIG. 1 to FIG. 3, in which FIG. 1 is a schematic flowchart of a temperature calibration method for an ear thermometer with a probe cover of the present disclosure, FIG. 2 is a schematic perspective view of the ear thermometer and the probe cover of the present disclosure, and FIG. 3 is a schematic front view of the ear thermometer of the present disclosure. The present disclosure provides an ear thermometer T and a probe cover U that are structurally compatible with each other. The ear thermometer T includes an ear thermometer body T1, a probe T2, and a plurality of activation elements T3. The probe T2 is disposed on the ear thermometer body T1 and allows the probe cover U to be placed thereon. The activation elements T3 are disposed on the ear thermometer body T1 and adjacent to the probe T2. In addition, the ear thermometer T further includes a control element (not shown in figures). The control element is disposed in the ear thermometer body T1 and is electrically connected to an electronic switch (not shown in figures), and the control element includes a memory (not shown in figures).

The probe cover U includes a conical main body U1, an annular elastomer U2, and a flange U3. The conical main body U1 has a closed end U11 and an open end U12. The closed end U11 and the open end U12 are arranged opposite to each other. When the probe cover U is placed on the probe T2 of the ear thermometer T, by whether a plurality of detection positions U30 on the flange U3 of the probe cover U have holes or not, the activation elements T3 on the ear thermometer T can be in a pressed state or an unpressed state, so that the activation elements T3 do not send a sensing signal or send at least one sensing signal. It is worth noting that infrared rays referred to herein are mainly the infrared rays emitted from a human body. The closed end U11 has a thickness. Since the closed end U11 is configured for penetration of the infrared rays (i.e., being where the infrared rays mainly pass through), the closed end U11 has different infrared transmittances according to thickness variations thereof. For the probe cover U, the infrared transmittance thereof actually refers to the infrared transmittance of the closed end U11. Therefore, the infrared transmittance of the probe cover U varies according to the thickness variations of the closed end U11. The annular elastomer U2 is connected to the open end U12 of the conical main body U1. The flange U3 is connected to the annular elastomer U2, and the annular elastomer U2 is located between the conical main body U1 and the flange U3. It is worth noting that the probe cover U provided in the present embodiment of the present disclosure can be an integrally-formed hard ear cap.

The present disclosure provides the temperature calibration method for the ear thermometer T with the probe cover U, which includes the following steps:

Step S101: providing the ear thermometer T with the probe cover U, the ear thermometer T including the plurality of activation elements T3 and the control element with the memory. The activation elements T3 are configured to sense the infrared transmittance of the probe cover U to obtain a measured transmittance value, and the memory stores a preset transmittance value corresponding to the infrared transmittance of the probe cover U.

In detail, in step S101, each of the activation elements T3 includes an ON state and an OFF state so that the activation elements T3 are arranged to form a plurality of different sensor combinations. The different sensor combinations respectively correspond to different infrared transmittances, and any two of the different sensor combinations have the two corresponding infrared transmittances that are different from one another. Similarly, the flange U3 has a plurality of detection positions U30, and each of the detection positions U30 has a positive detection pattern or a negative detection pattern, such that the detection positions U30 are arranged to form a plurality of different detection combinations. The different detection combinations respectively correspond to the different infrared transmittances, and any two of the different detection combinations have the two corresponding infrared transmittances that are different from one another.

Furthermore, in the embodiment shown in the present disclosure, the activation elements T3 of the ear thermometer T are mechanical pins, the ON state of the activation elements T3 is a pin in a pressed state, and the OFF state of the activation elements T3 is a pin in an unpressed state. The positive detection pattern refers to the flange U3 having an opening formed at the detection positions U30, and the negative detection pattern refers to the flange U3 not having an opening at the detection positions U30, but the present disclosure is not limited thereto. In other embodiments, the positive detection pattern can refer to the flange U3 being formed by a light-permeable material at the detection positions U30, and the negative detection pattern can refer to the flange U3 being formed by an opaque material at the detection positions U30 (not shown in the drawings). The activation elements T3 can be, for example, an optoelectronic switch (i.e., optoelectronic sensors). Translucence or opaqueness of the detection positions U30 on the flange U3 of the probe cover U can be used to block a light beam emitted from the optoelectronic switches or allow the same to pass through. In this way, the infrared transmittance of the probe cover U can be detected. The ON state of the activation elements T3 is a state in which the light beam emitted by the optoelectronic switch is blocked, and the OFF state of the activation elements T3 is a state in which the light beam emitted by the optoelectronic switch is not blocked.

When the probe cover U is placed on the probe T2 of the ear thermometer T, if each of the activation elements T3 is in the ON state (that is, a pin is in the pressed state), it means that the detection positions U30 on the flange U3 of the probe cover U corresponding to the activation elements T3 have the negative detection pattern (no opening is formed). Conversely, if each of the activation elements T3 is in the OFF state (that is, a pin is in the unpressed state), it means that the detection positions U30 on the flange U3 of the probe cover U corresponding to the activation elements T3 have the positive detection pattern (the opening is formed). When each of the activation elements T3 is in the ON state (that is, a pin is in the pressed state), each of the activation elements T3 can send a sensing signal to the control element.

Therefore, the different sensor combinations formed by the activation elements T3 (for example, one of the activation elements T3 is in the ON state, and another one of the activation elements T3 is in the OFF state) can be not sending or sending at least one sensing signal to the control element. The control element can identify the infrared transmittance of the probe cover U according to a received sensing signal (or by not receiving a sensing signal) so as to obtain the measured transmittance value.

The memory in the control element stores a preset infrared transmittance value and a calibration parameter. The control element calibrates the measured initial temperature according to the preset infrared transmittance value and the calibration parameter, and according to the infrared transmittance of the probe cover U measured by the activation elements T3, so as to obtain a calibrated temperature value.

Step S102: using the ear thermometer T to measure an object to be tested to obtain an uncalibrated temperature.

In detail, in step S102, the ear thermometer T with the probe cover U is used to measure the object to be tested, for example, the human body, to obtain an initial temperature (that is, ear temperature). Due to the probe cover U itself having the infrared transmittance, the infrared transmittance of the probe cover U is not consistent with the preset infrared transmittance value stored in the memory inside the ear thermometer T. Therefore, the initial temperature obtained in this situation is actually the uncalibrated temperature.

Step S103: obtaining an infrared radiation energy emitted by the object to be tested, according to the uncalibrated temperature, the measured transmittance value, a preset transmittance value, and a radiation energy measurement formula.

Step S104: calibrating the uncalibrated temperature to a calibrated temperature, according to a temperature calibration function.

Furthermore, in steps S103 and S104, the control element inside the ear thermometer T can be, for example, a central processing unit (CPU) or a microcontroller (MCU) that is commonly found in electronic devices, but the present disclosure is not limited thereto. The control element can calculate and obtain the infrared radiation energy emitted by the object to be tested, according to the uncalibrated temperature, the measured transmittance value, the calibration parameter, and the preset transmittance value that are measured or obtained. Next, the control element calibrates the uncalibrated temperature to the calibrated temperature, according to the temperature calibration function. The radiation energy measurement formula includes the following relation of: $E=K\times((T_{objr})^4-(T_{amb})^4)\times t_r/t_d$. In which E is the infrared radiation energy emitted by the object to be tested, K is a calibration coefficient, $T_{objr}$ is the uncalibrated temperature of the object to be tested, and a unit of the uncalibrated temperature in the radiation energy measurement formula is Kelvin (K). $T_{amb}$ is an ambient temperature, a unit of the ambient temperature is Kelvin (K), $t_d$ is the preset transmittance value, and $t_r$ is the measured transmittance value. In the present disclosure, the ambient temperature $T_{amb}$ is preset to be 296.15 K.

Furthermore, the temperature calibration function includes the following relation of: $K\times((T_{objd})^4-(T_{amb})^4)=(t_d/t_r)\times E=(t_d/t_r)\times K\times((T_{objr})^4-(T_{amb})^4)\times t_r/t_d=K\times((T_{objr})^4-(T_{amb})^4)$. In which $T_{objd}$ is the calibrated temperature of the object to be tested, and a unit of the calibrated temperature is Kelvin (K). That is to say, $K\times((T_{objd})^4-(T_{amb})^4)=K\times((T_{objr})^4-(T_{amb})^4)$ is obtained by multiplying the radiation energy measurement formula by $t_r/t_d$, so that the uncalibrated temperature $T_{objr}$ of the object to be tested is calibrated to the calibrated temperature $T_{objd}$.

First Embodiment

Figure 4:
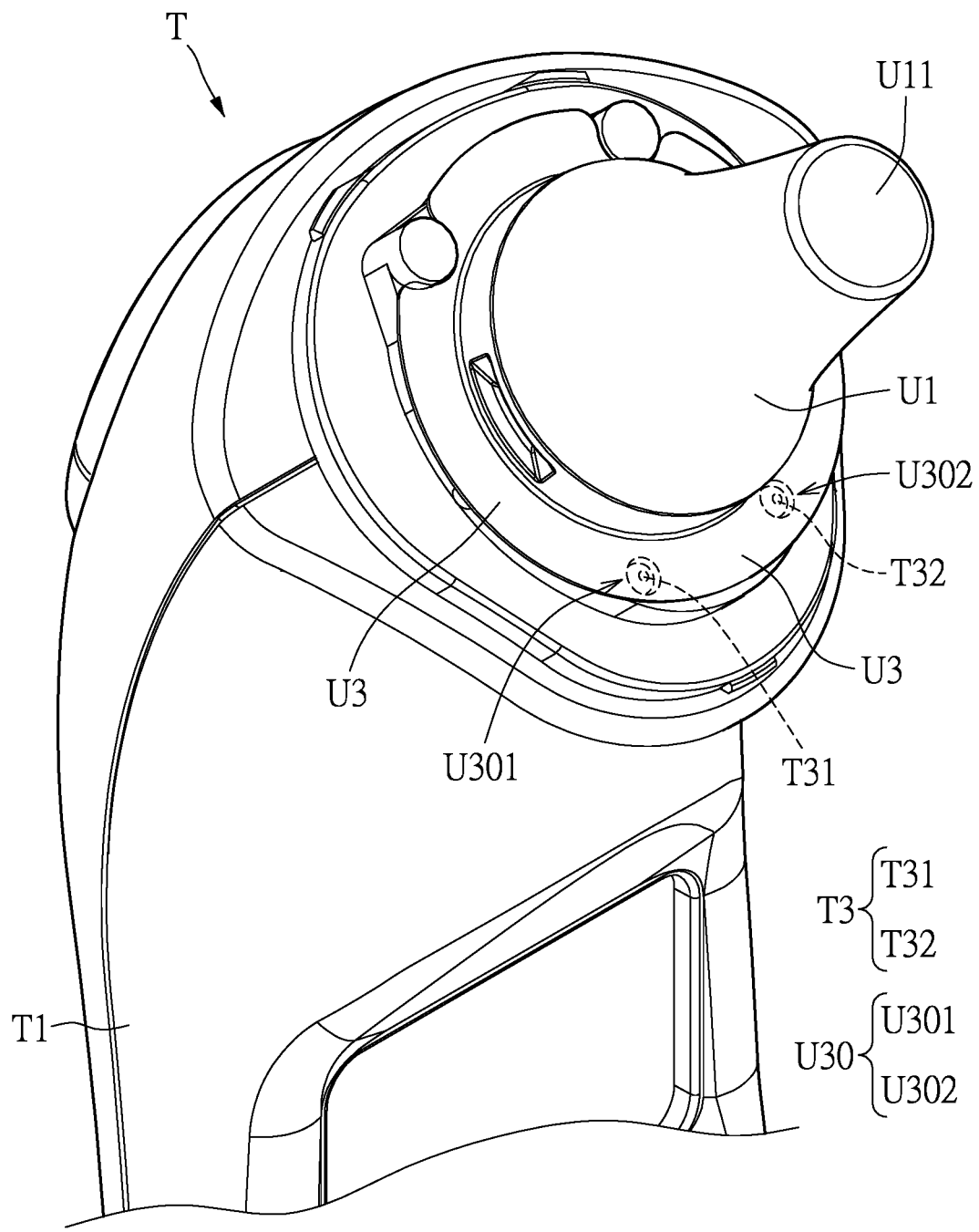
FIG. 4 is a schematic view of a first sensor combination and a first detection combination of the ear thermometer and the probe cover according to a first embodiment of the present disclosure.
Figure 5:
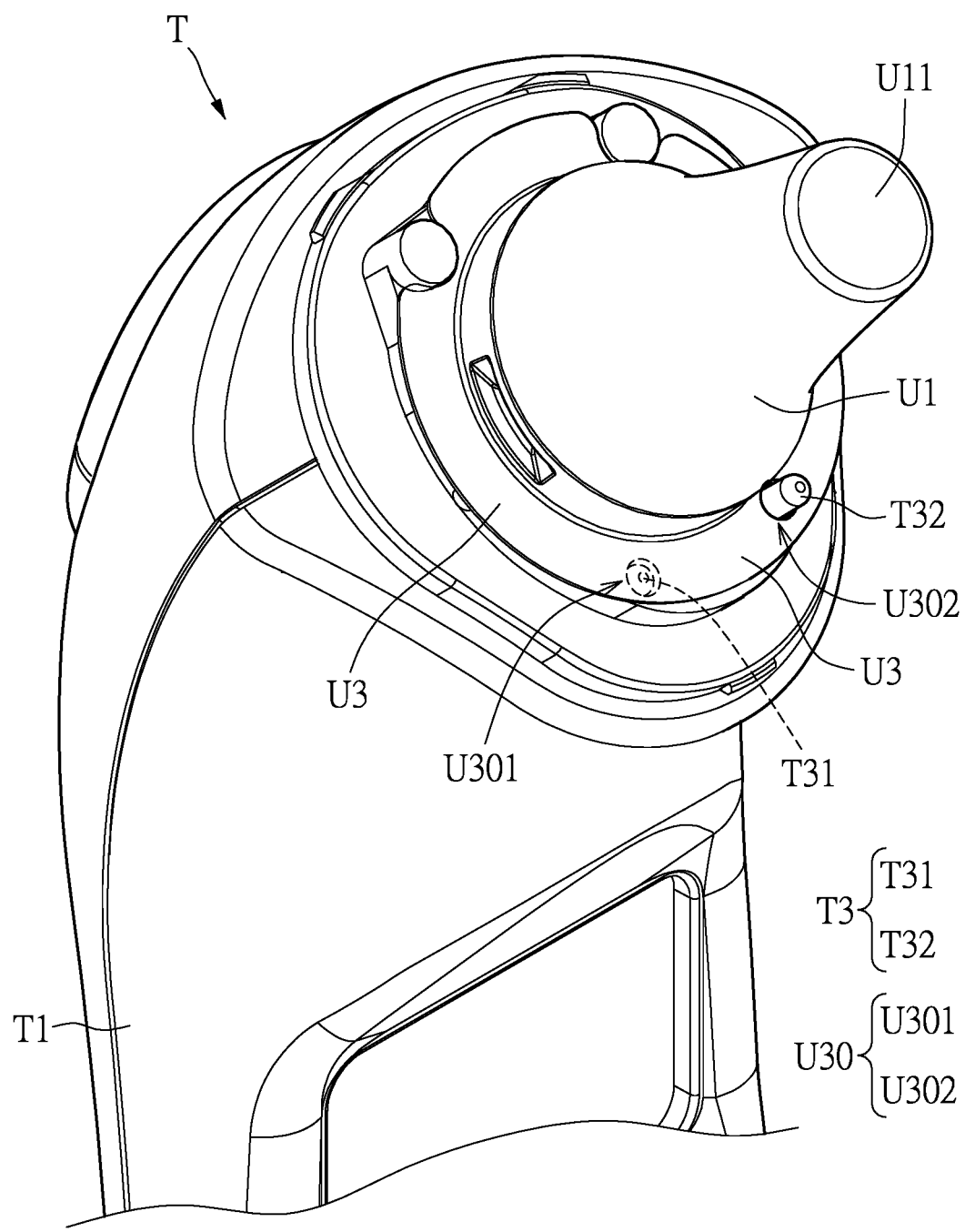
FIG. 5 is a schematic view of a second sensor combination and a second detection combination of the ear thermometer and the probe cover according to the first embodiment of the present disclosure.
Figure 6:
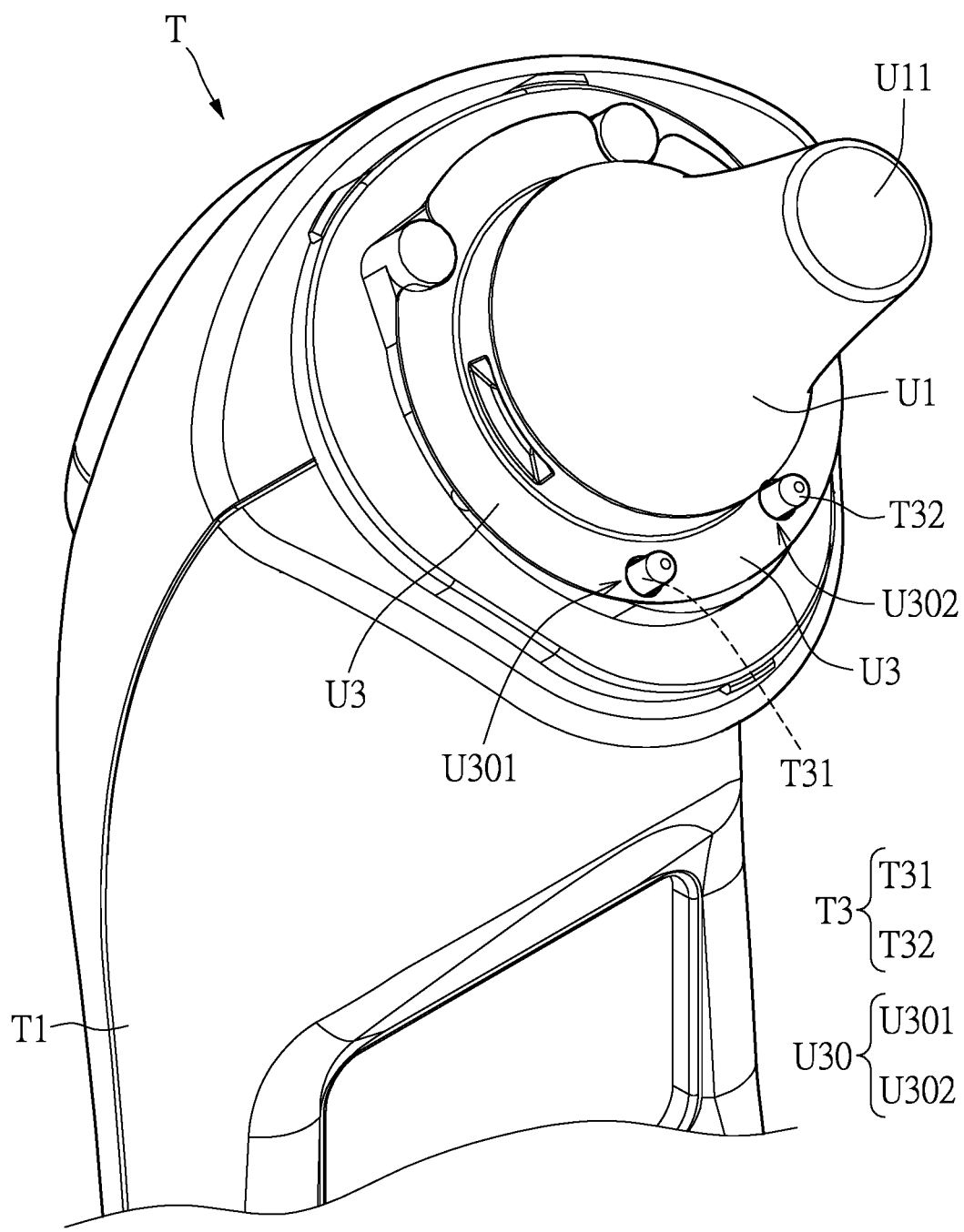
FIG. 6 is a schematic view of a third sensor combination and a third detection combination of the ear thermometer and the probe cover according to the first embodiment of the present disclosure.

Referring to FIG. 4 to FIG. 6, the specific features of the activation elements T3 on the ear thermometer T provided by a first embodiment of the present disclosure will be further described. In this embodiment, a quantity of the activation elements T3 is set to be two, and a quantity of the sensor combinations is set to be three. The two activation elements T3 are divided into a first activation element T31 and a second activation element T32, and the three sensor combinations are divided into a first sensor combination, a second sensor combination, and a third sensor combination. In addition, it should be noted that since each of the activation elements T3 can either be in the ON state or the OFF state, the two activation elements T3 in this embodiment can have up to four sensor combinations. However, an actual quantity of the sensor combinations used can be adjusted according to user requirements, and the present disclosure is not limited to the above-mentioned examples.

As shown in FIG. 4, FIG. 4 is a schematic view of a first sensor combination and a first detection combination of the ear thermometer and the probe cover according to a first embodiment of the present disclosure. The first sensor combination refers to the first activation element T31 and the second activation element T32 in the ON state. In detail, in the first sensor combination, the first activation element T31 on the ear thermometer T is in the ON state, that is, the first activation element T31 is a pin in the pressed state, and a first detection position U301 on the flange U3 of the probe cover U is in the negative detection pattern (no opening is formed). The second activation element T32 on the ear thermometer T is also in the ON state, that is, the second activation element T32 is also a pin in the pressed state, and a second detection position U302 on the flange U3 of the probe cover U is also in the negative detection pattern (no opening is formed). In other words, the two activation elements T3 on the ear thermometer T are both pins in the pressed state. In addition, the infrared transmittance of the probe cover U corresponding to the first sensor combination is set to be 80%. That is to say, when the probe cover U is placed on the probe T2 of the ear thermometer T, the two activation elements T3 can respectively contact the two detection positions U30 on the flange U3 of the probe cover U, and the two activation elements T3 are respectively pressed down by the two detection positions U30 so that the activation elements T3 can detect the infrared transmittance of the probe cover U as 80%.

As shown in FIG. 5, FIG. 5 is a schematic view of a second sensor combination and a second detection combination of the ear thermometer and the probe cover according to the first embodiment of the present disclosure. The second sensor combination refers to the first activation element T31 in the ON state and the second activation element T32 in the OFF state. In detail, in the second sensor combination, the first activation element T31 on the ear thermometer T is in the ON state, that is, the first activation element T31 is a pin in the pressed state, and the first detection position U301 on the flange U3 of the probe cover U is in the negative detection pattern (no opening is formed). The second activation element T32 on the ear thermometer T is in the OFF state, that is, the second activation element T32 is a pin in the unpressed state, and the second detection position U302 on the flange U3 of the probe cover U is in the positive detection pattern (the opening is formed). In other words, only one of the two activation elements T3 on the ear thermometer T is a pin in the pressed state. In addition, the infrared transmittance of the probe cover U corresponding to the second sensor combination is set to be 79.5%. That is to say, when the probe cover U is placed on the probe T2 of the ear thermometer T, the two activation elements T3 can respectively contact the two detection positions U30 on the flange U3 of the probe cover U, and the first activation element T31 of the two activation elements T3 is pressed down by the two detection positions U30 so that the activation elements T3 can detect the infrared transmittance of the probe cover U as 79.5%.

As shown in FIG. 6, FIG. 6 is a schematic view of a third sensor combination and a third detection combination of the ear thermometer and the probe cover according to the first embodiment of the present disclosure. The third sensor combination refers to the first activation element T31 and the second activation element T32 in the OFF state. In detail, in the third sensor combination, the first activation element T31 on the ear thermometer T is in the OFF state, that is, the first activation element T31 is a pin in the unpressed state, and the first detection position U301 on the flange U3 of the probe cover U is in the positive detection pattern (the opening is formed). The second activation element T32 on the ear thermometer T is also in the OFF state, that is, the second activation element T32 is also a pin in the unpressed state, and the second detection position U302 on the flange U3 of the probe cover U is also in the positive detection pattern (the opening is formed). In other words, the two activation elements T3 on the ear thermometer T are both pins in the unpressed state. In addition, the infrared transmittance of the probe cover U corresponding to the third sensor combination is set to be 80.5%. That is to say, when the probe cover U is placed on the probe T2 of the ear thermometer T, the two activation elements T3 can respectively contact the two detection positions U30 on the flange U3 of the probe cover U, and the two activation elements T3 are not pressed down by the two detection positions U30 so that the activation elements T3 can detect the infrared transmittance of the probe cover U as 80.5.

In addition, it should be noted that the above-mentioned infrared transmittance of the probe cover U corresponding to each of the sensor combinations is set according to user requirements, and the present disclosure is not limited thereto. Therefore, in other embodiments, the infrared transmittances of the probe cover U corresponding to the first sensor combination, the second sensor combination, and the third sensor combination do not have to be 80%, 79.5%, and 80.5% (i.e., being the same as those mentioned in the present embodiment), but can also be other values such as 81%, 80%, and 79%.

Second Embodiment

Referring to FIG. 7 to FIG. 11, the specific features of the activation elements T3 on the ear thermometer T provided by a second embodiment of the present disclosure will be further described. In this embodiment, a quantity of the activation elements T3 is set to be three, and a quantity of the sensor combinations is set to be five. Three activation elements T3 are divided into a first activation element T31, a second activation element T32, and a third activation element T33, and five sensor combinations are divided into a first sensor combination, a second sensor combination, a third sensor combination, a fourth sensor combination, and a fifth sensor combination. In addition, it should be noted that since each of the activation elements T3 can either be in the ON state or the OFF state, the three activation elements T3 in this embodiment can have up to eight sensor combinations. However, an actual quantity of the sensor combinations used can be adjusted according to user requirements, and the present disclosure is not limited to the above-mentioned examples.

Figure 7:
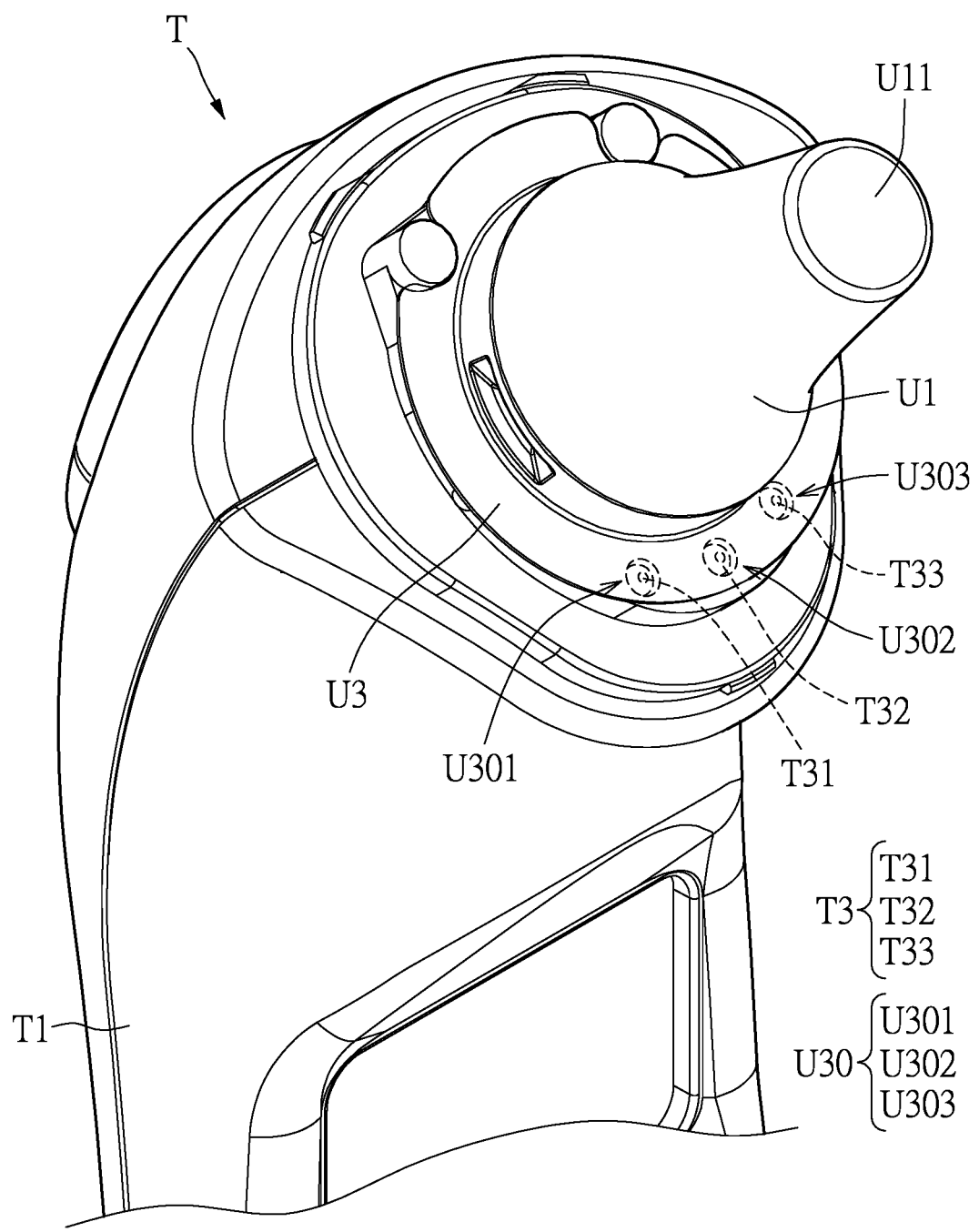
FIG. 7 is a schematic view of a first sensor combination and a first detection combination of the ear thermometer and the probe cover according to a second embodiment of the present disclosure.

As shown in FIG. 7, FIG. 7 is a schematic view of a first sensor combination and a first detection combination of the ear thermometer and the probe cover according to a second embodiment of the present disclosure. The first sensor combination refers to the first activation element T31, the second activation element T32, and the third activation element T33 in the ON state. In detail, in the first sensor combination, the first activation element T31 on the ear thermometer T is in the ON state, that is, the first activation element T31 is a pin in the pressed state, and the first detection position U301 on the flange U3 of the probe cover U is in the negative detection pattern (no opening is formed). The second activation element T32 on the ear thermometer T is also in the ON state, that is, the second activation element T32 is also a pin in the pressed state, and the second detection position U302 on the flange U3 of the probe cover U is also in the negative detection pattern (no opening is formed). The third activation element T33 is again in the ON state, that is, the third activation element T33 is again a pin in the pressed state, and a third detection position U303 on the flange U3 of the probe cover U is again in the negative detection pattern (no opening is formed). In other words, the three activation elements T3 on the ear thermometer T are all pins in the pressed state. In addition, the infrared transmittance of the probe cover U corresponding to the first sensor combination is set to be 80%. That is to say, when the probe cover U is placed on the probe T2 of the ear thermometer T, the three activation elements T3 can respectively contact the three detection positions U30 on the flange U3 of the probe cover U, and the three activation elements T3 (the first activation element T31, the second activation element T32, and the third activation element T33) are respectively pressed down by the three detection positions U30 so that the activation elements T3 can detect the infrared transmittance of the probe cover U as 80%.

Figure 8:
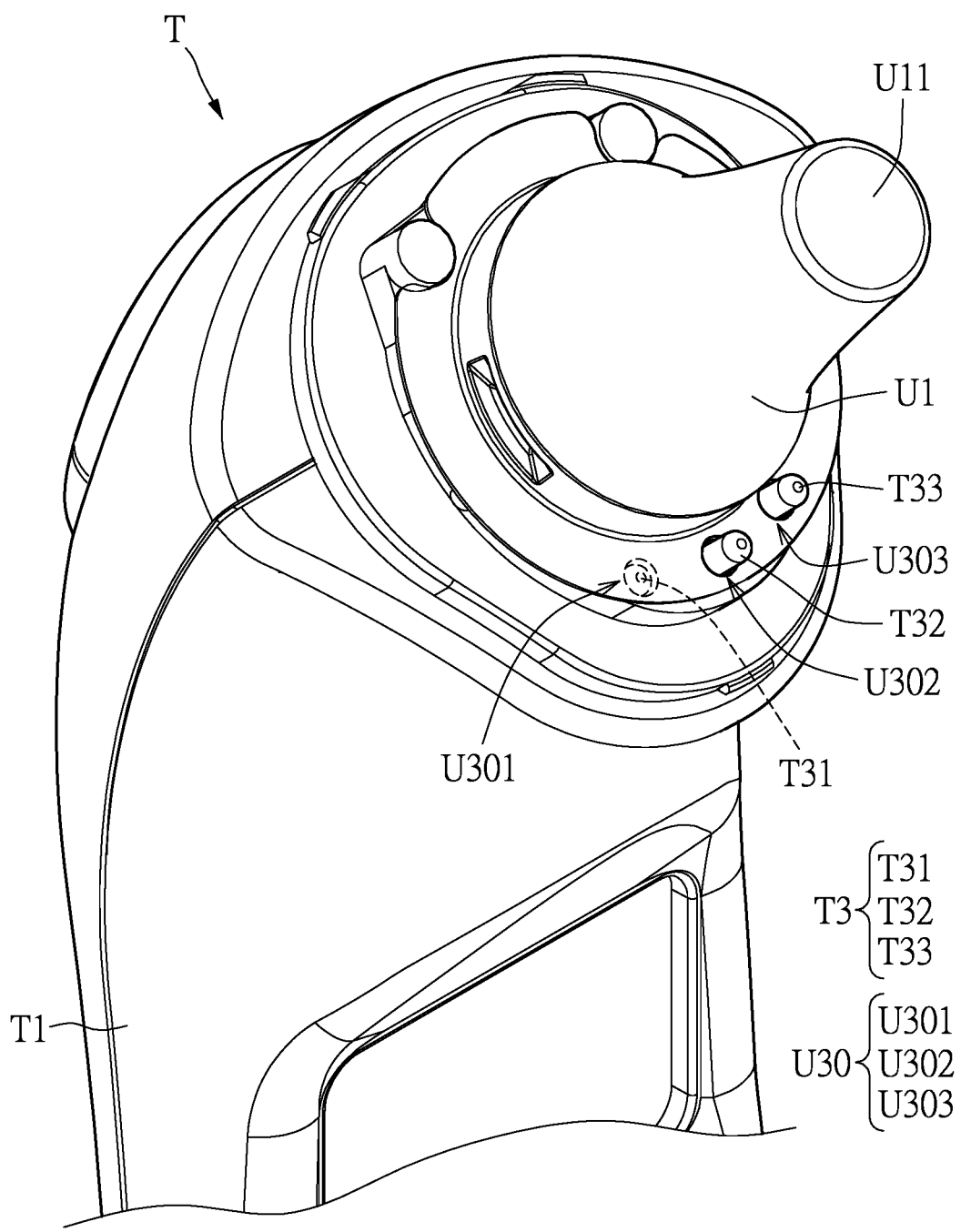
FIG. 8 is a schematic view of a second sensor combination and a second detection combination of the ear thermometer and the probe cover according to the second embodiment of the present disclosure.

As shown in FIG. 8, FIG. 8 is a schematic view of a second sensor combination and a second detection combination of the ear thermometer and the probe cover according to the second embodiment of the present disclosure. The second sensor combination refers to the first activation element T31 in the ON state, and the second activation element T32 and the third activation element T33 in the OFF state. In detail, in the second sensor combination, the first activation element T31 on the ear thermometer T is in the ON state, that is, the first activation element T31 is a pin in the pressed state, and the first detection position U301 on the flange U3 of the probe cover U is in the negative detection pattern (no opening is formed). The second activation element T32 on the ear thermometer T is in the OFF state, that is, the second activation element T32 is a pin in the unpressed state, and the second detection position U302 on the flange U3 of the probe cover U is in the positive detection pattern (the opening is formed). The third activation element T33 on the ear thermometer T is also in the OFF state, that is, the third activation element T33 is also a pin in the unpressed state, and the third detection position U303 on the flange U3 of the probe cover U is also in the positive detection pattern (no opening is formed). In other words, only one of the three activation elements T3 on the ear thermometer T is a pin in the pressed state. In addition, the infrared transmittance of the probe cover U corresponding to the second sensor combination is set to be 80.5%. That is to say, when the probe cover U is placed on the probe T2 of the ear thermometer T, the three activation elements T3 can respectively contact the three detection positions U30 on the flange U3 of the probe cover U, and the first activation element T31 of the three activation elements T3 is pressed down by the three detection positions U30 so that the activation elements T3 can detect the infrared transmittance of the probe cover U as 80.5%.

Figure 9:
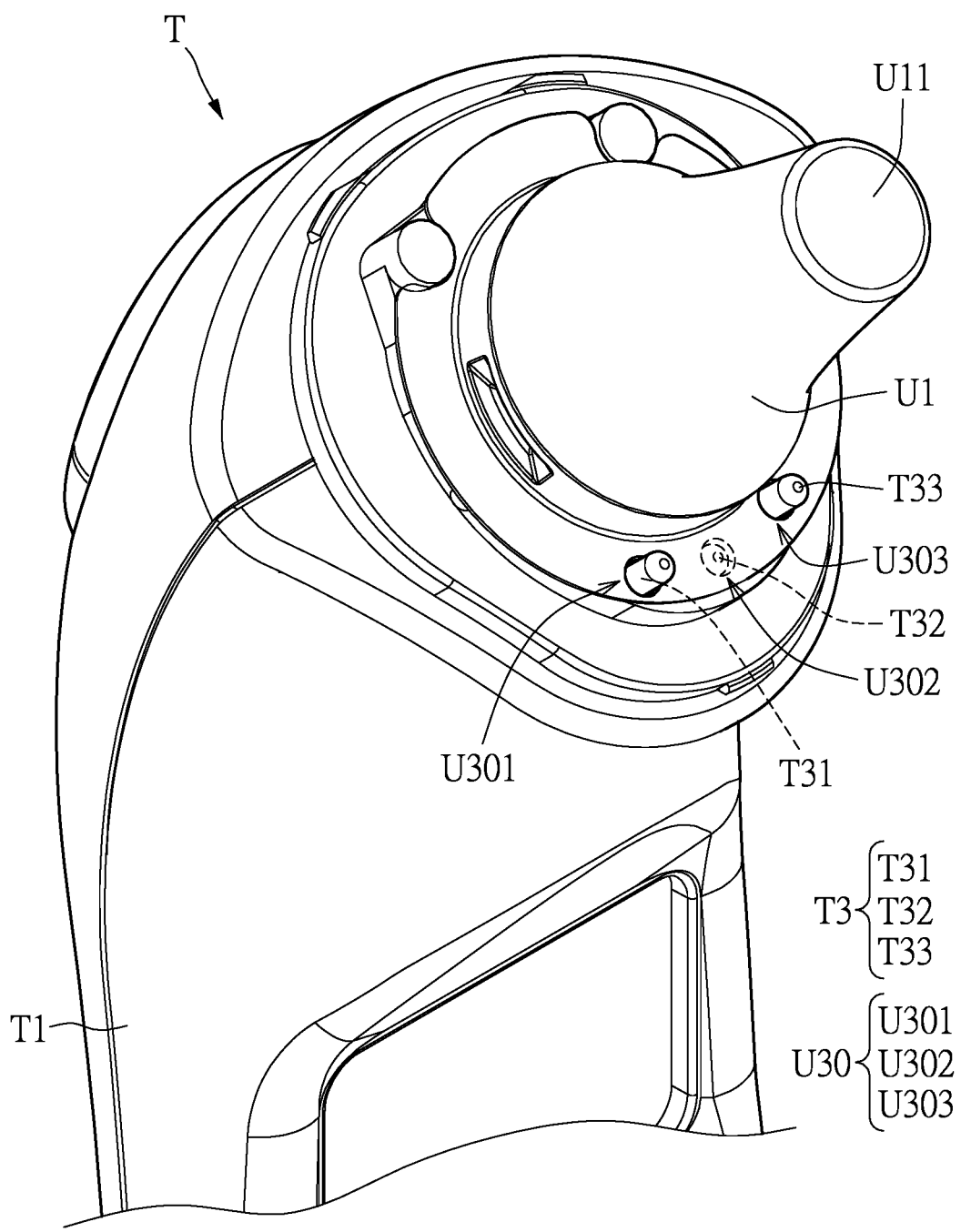
FIG. 9 is a schematic view of a third sensor combination and a third detection combination of the ear thermometer and the probe cover according to the second embodiment of the present disclosure.

As shown in FIG. 9, FIG. 9 is a schematic view of a third sensor combination and a third detection combination of the ear thermometer and the probe cover according to the second embodiment of the present disclosure. The third sensor combination refers to the second activation element T32 in the ON state, and the first activation element T31 and the third activation element T33 in the OFF state. In detail, in the third sensor combination, the first activation element T31 on the ear thermometer T is in the OFF state, that is, the first activation element T31 is a pin in the unpressed state, and the first detection position U301 on the flange U3 of the probe cover U is in the positive detection pattern (the opening is formed). The second activation element T32 on the ear thermometer T is in the ON state, that is, the second activation element T32 is a pin in the pressed state, and the second detection position U302 on the flange U3 of the probe cover U is in the negative detection pattern (no opening is formed). The third activation element T33 on the ear thermometer T is also in the OFF state, that is, the third activation element T33 is also a pin in the unpressed state, and the third detection position U303 on the flange U3 of the probe cover U is also in the positive detection pattern (the opening is formed). In other words, only one of the three activation elements T3 on the ear thermometer T is a pin in the pressed state. In addition, the infrared transmittance of the probe cover U corresponding to the third sensor combination is set to be 81%. That is to say, when the probe cover U is placed on the probe T2 of the ear thermometer T, the three activation elements T3 can respectively contact the three detection positions U30 on the flange U3 of the probe cover U, and the second activation element T32 of the three activation elements T3 is pressed down by the three detection positions U30 so that the activation elements T3 can detect the infrared transmittance of the probe cover U as 81%.

Figure 10:
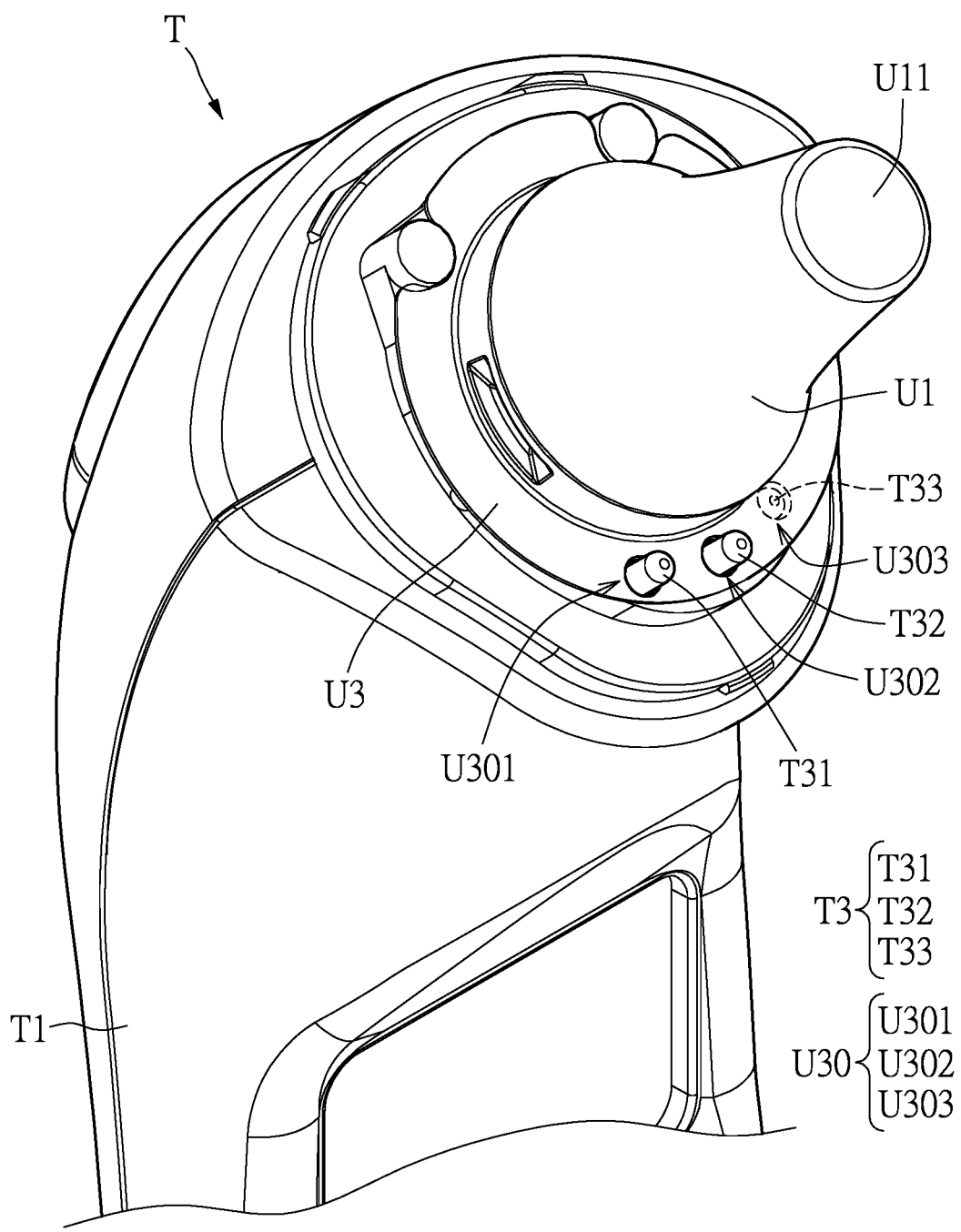
FIG. 10 is a schematic view of a fourth sensor combination and a fourth detection combination of the ear thermometer and the probe cover according to the second embodiment of the present disclosure.

As shown in FIG. 10, FIG. 10 is a schematic view of a fourth sensor combination and a fourth detection combination of the ear thermometer and the probe cover according to the second embodiment of the present disclosure. The fourth sensor combination refers to the third activation element T33 in the ON state, and the first activation element T31 and the second activation element T32 in the OFF state. In detail, in the fourth sensor combination, the first activation element T31 on the ear thermometer T is in the OFF state, that is, the first activation element T31 is a pin in the unpressed state, and the first detection position U301 on the flange U3 of the probe cover U is in the positive detection pattern (the opening is formed). The second activation element T32 on the ear thermometer T is also in the OFF state, that is, the second activation element T32 is also a pin in the unpressed state, and the second detection position U302 on the flange U3 of the probe cover U is also in the positive detection pattern (the opening is formed). The third activation element T33 on the ear thermometer T is in the ON state, that is, the third activation element T33 is a pin in the pressed state, and the third detection position U303 on the flange U3 of the probe cover U is in the negative detection pattern (no opening is formed). In other words, only one of the three activation elements T3 on the ear thermometer T is a pin in the pressed state. In addition, the infrared transmittance of the probe cover U corresponding to the fourth sensor combination is set to be 79.5%. That is to say, when the probe cover U is placed on the probe T2 of the ear thermometer T, the three activation elements T3 can respectively contact the three detection positions U30 on the flange U3 of the probe cover U, and the third activation element T33 of the three activation elements T3 is pressed down by the three detection positions U30 so that the activation elements T3 can detect the infrared transmittance of the probe cover U as 79.5%.

Figure 11:
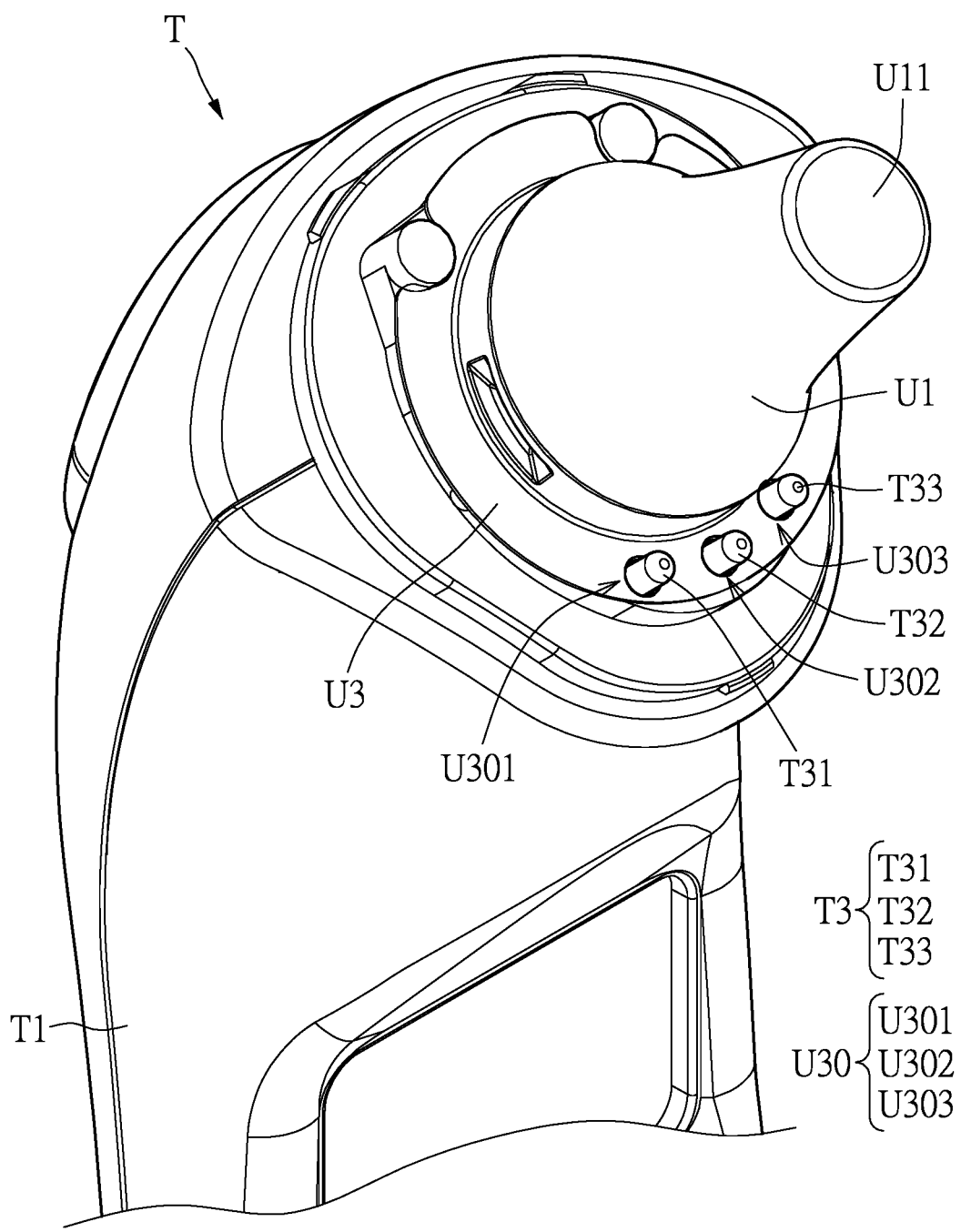
FIG. 11 is a schematic view of a fifth sensor combination and a fifth detection combination of the ear thermometer and the probe cover according to the second embodiment of the present disclosure.

As shown in FIG. 11, FIG. 11 is a schematic view of a fifth sensor combination and a fifth detection combination of the ear thermometer and the probe cover according to the second embodiment of the present disclosure. The fifth sensor combination refers to the first activation element T31, the second activation element T32, and the third activation element T33 in the OFF state. In detail, in the fifth sensor combination, the first activation element T31 on the ear thermometer T is in the OFF state, that is, the first activation element T31 is a pin in the unpressed state, and the first detection position U301 on the flange U3 of the probe cover U is in the positive detection pattern (the opening is formed). The second activation element T32 on the ear thermometer T is also in the OFF state, that is, the second activation element T32 is also a pin in the unpressed state, and the second detection position U302 on the flange U3 of the probe cover U is also in the positive detection pattern (the opening is formed). The third activation element T33 on the ear thermometer T is again in the OFF state, that is, the third activation element T33 is again a pin in the unpressed state, and the third detection position U303 on the flange U3 of the probe cover U is again in the positive detection pattern (the opening is formed). In other words, the three activation elements T3 on the ear thermometer T are pins in the unpressed state. In addition, the infrared transmittance of the probe cover U corresponding to the fifth sensor combination is set to be 79%. That is to say, when the probe cover U is placed on the probe T2 of the ear thermometer T, the three activation elements T3 can respectively contact the three detection positions U30 on the flange U3 of the probe cover U, and any one of the three activation elements T3 (the first activation element T31, the second activation element T32, and the third activation element T33) is not pressed down by the three detection positions U30 so that the activation elements T3 can detect the infrared transmittance of the probe cover U as 79%.

In addition, it should be noted that the above-mentioned infrared transmittance of the probe cover U corresponding to each of the sensor combinations is set according to the user requirements, and the present disclosure is not limited thereto. Therefore, in other embodiments, the infrared transmittance of the probe cover U corresponding to the first sensor combination, the second sensor combination, the third sensor combination, the fourth sensor combination, and the fifth sensor combination do not have to be 80%, 80.5%, 81%, 79.5%, and 79% (i.e., being the same as those mentioned in the present embodiment), but can also be other values, such as 82%, 81%, 80%, 79%, and 78%.

Beneficial Effects of the Embodiments

One of the beneficial effects of the present disclosure is that, in the temperature calibration method for the ear thermometer with the probe cover provided herein, through the technical solutions of "obtaining the infrared radiation energy emitted by the object to be tested, according to the uncalibrated temperature, the measured transmittance value, the preset transmittance value, and the radiation energy measurement formula" and "calibrating the uncalibrated temperature to the calibrated temperature, according to a temperature calibration function", the ear thermometer can calibrate the probe covers with different infrared transmittances to obtain an accurate ear temperature value after the calibration is performed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A temperature calibration method for an ear thermometer with a probe cover, comprising:
    providing the ear thermometer with the probe cover, the ear thermometer including a plurality of activation elements, a control element with a memory, an ear thermometer body and a probe being disposed on the ear thermometer body and allowing the probe cover to be placed thereon, the activation elements being configured to sense an infrared transmittance of the probe cover to obtain a measured transmittance value and the memory storing a preset transmittance value corresponding to the infrared transmittance of the probe cover;
    using the ear thermometer to measure an object to be tested to obtain an uncalibrated temperature;
    obtaining infrared radiation energy emitted by the object to be tested, according to the uncalibrated temperature, the measured transmittance value, the preset transmittance value, and a radiation energy measurement formula; and
    calibrating the uncalibrated temperature to a calibrated temperature, according to a temperature calibration function;
    wherein the radiation energy measurement formula includes the following relation:

$$E = K \times ((T_{objr})^4 - (T_{amb})^4) \times t_r/t_d;$$

wherein E is the infrared radiation energy emitted by the object to be tested, K is a calibration coefficient, $T_{objr}$ is the uncalibrated temperature of the object to be tested, and a unit of the uncalibrated temperature in the radiation energy measurement formula is Kelvin (K), and wherein $T_{amb}$ is an ambient temperature preset to be 296.15 K, a unit of the ambient temperature is Kelvin (K), $t_d$ is the preset transmittance value, and $t_r$ is the measured transmittance value;

wherein the temperature calibration function includes the following relation of:

$$K \times ((T_{objd})^4 - (T_{amb})^4) = (t_d/t_r) \times E = (t_d/t_r) \times K \times ((T_{objr})^4 - (T_{amb})^4) \times t_r/t_d = K \times ((T_{objr})^4 - (T_{amb})^4);$$

wherein $T_{objd}$ is the calibrated temperature of the object to be tested, and a unit of the calibrated temperature is Kelvin (K); and
    wherein the activation elements of the ear thermometer are disposed on the ear thermometer body and adjacent to the probe, each of the activation elements includes an ON state and an OFF state so that the activation elements are arranged to form a plurality of different sensor combinations; wherein the different sensor combinations respectively correspond to different infrared transmittances, and any two of the different sensor combinations have the two corresponding infrared transmittances that are different from one another.

2. The temperature calibration method according to claim 1, wherein the activation element is a mechanical pin, the ON state of the activation element is the pin being in a pressed state, and the OFF state of the activation element is the pin being in an unpressed state.

3. The temperature calibration method according to claim 1, wherein, when a quantity of the activation elements is set to be two, a quantity of the sensor combinations is set to be at most four.

4. The temperature calibration method according to claim 1, wherein, when a quantity of the activation elements is set to be three, a quantity of the sensor combinations is set to be at most eight.

5. The temperature calibration method according to claim 1, wherein the probe cover includes:
    a conical main body having a closed end and an open end, wherein the closed end and the open end are arranged opposite to each other, wherein the closed end has a thickness, the closed end is penetrable by infrared rays, and the closed end has different infrared transmittances according to thickness variations of the closed end;
    an annular elastomer connected to the open end of the conical main body; and
    a flange connected to the annular elastomer, the annular elastomer being located between the conical main body and the flange;
    wherein the flange has a plurality of detection positions; wherein each of the detection positions has a positive detection pattern or a negative detection pattern, such that the activation elements are arranged to form a plurality of different detection combinations; wherein the different detection combinations respectively correspond to different infrared transmittances, and any two of the different detection combinations have the two corresponding infrared transmittances that are different from one another.

6. The temperature calibration method according to claim 5, wherein the positive detection pattern refers to the flange having an opening formed at the detection position, and the negative detection pattern refers to the flange having no opening formed at the detection position.

* * * * *